Patented Oct. 11, 1932

1,882,028

UNITED STATES PATENT OFFICE

HERBERT E. OTTING, OF WESTERVILLE, OHIO, ASSIGNOR TO M AND R DIETETIC LABORATORIES, INC., OF COLUMBUS, OHIO, A CORPORATION OF OHIO

MILK PRODUCT

No Drawing.  Application filed May 21, 1930. Serial No. 454,520.

The present invention relates to improvements in milk products, and particularly in products containing milk solids, such as milk chocolate, wherein substantial freedom from water is desirable and wherein full development of the milk flavor during working or trituration is required.

In the manufacture of concentrated milk products, the spray-drying process has become recognized as the process effecting the elimination of water with the greatest control and the best preservation of the constituents of the original fluid, and with a minimum of alteration or deleterious action in the drying process. Notwithstanding this fact, it has not been possible hitherto to employ spray-dried milk powder in the production of products which are low in water or substantially anhydrous, such as milk chocolate, and wherein the development of certain important characteristics on trituration at moderately elevated temperatures is required.

For example, in the manufacture of milk chocolate, it is required that there be secured, in the conching operation, a full development of the milk flavor; and in addition a coalescence of the solids of the milk with each other and those of the chocolate in a smooth, uniform mass, and also a certain reduction in viscosity to permit the use of the chocolate in dipping or to permit it to be poured into molds without premature setting. It is highly desirable that the milk solids be employed in substantially anhydrous form, to avoid the necessity for the removal of water from the mixture. However, spray-dried whole milk powder fails to realize the conditions required in the production of the chocolate, since the addition of extra cocoa butter or like material is required when it is employed. For example, in a given mixture, wherein the milk solids are provided in other forms, for example, as condensed or evaporated milk, the desired development of flavor, coalescence of milk solid particles and lowering in viscosity of the mass can be secured; but when the same proportion of milk solids are added in the form of spray-dried whole milk powder, an additional quantity of cocoa butter, amounting to from 3 to 10%, is required in order to secure the same characteristics in the product. Since the cocoa butter is the most expensive constituent of the mixture, the necessity for its use when spray-dried whole milk powder is employed has made the use of the latter economically impracticable.

As a result of many experiments, I am inclined to believe that the difficulties in the employment of spray-dried powder produced from whole milk arises chiefly from a failure of the particles to coalesce with one another and with the particles of chocolate during the conching or mixing operation and I have also reached the conclusion that this failure of the particles to coalesce is probably due to the formation of a casein coating on the minute particles of fat, which are very finely dispersed or homogenized by reason of the high pressures necessarily employed in the spray-drying operation.

I have found that the hereinbefore difficulties in connection with the use of spray-dried milk powders may be overcome in the following manner.

In accordance with the present invention, instead of employing a spray-dried milk powder formed by spray-drying whole milk, I form a spray-dried product of similar composition by intimately mixing in the requisite proportions, spray-dried powders formed respectively from a low-fat milk product and a high-fat milk product or cream, which may suitably be derived by separation of milk into a skim-milk portion and a cream respectively. By admixing the spray-dried low-fat and high-fat products in substantially the proportions in which they are formed, a composite product having the composition and apparent characteristics of the powder derived by spray-drying whole milk is secured, but differing from the latter entirely in behavior on trituration alone or in combination with other constituents, as in the conching of milk chocolate. I have found that, in general, the incorporation into a spray-dried milk powder derived from the spray-drying of whole milk or of a portion of whole milk having a lower fat content than whole milk, of a spray-dried milk product derived from material having a fat content of about 7.50% or higher, the latter being in a proportion of at least 25% of the mixture, results in a material having the desired properties, particularly of coalescence under the conditions named, while retaining the advantages resulting from the high degree of dispersion of the solids and the superior preservation of their material characteristics secured in the spray-drying process. As hereinbefore indicated, the materials employed in accordance with my invention may be secured from the products derived by separation of a whole milk, these being recombined in any desired proportion, and preferably in such proportion as to secure a combined product, the constituents of which are in the same proportion as would be secured by spray-drying the whole milk. However, I may secure milk products of the desired type on the market and mix them in any desired proportions.

For example, a whole milk having a fat content of 3.52% and the content of solids other than fat of 8.79%, on spray-drying, gave a product containing 28.20% fat and 1.50% moisture. This product, on trituration in a mortar at a temperature of 100° F. or higher, failed to coalesce. When incorporated in a milk chocolate batch of typical composition, for example, one containing 16% milk solids, 10% cocoa mass, 50% sugar and 24% cocoa butter, it failed to develop a satisfactory flavor or a sufficiently low viscosity for dipping purposes, although a batch of similar composition, in which the milk solids were provided in the form of a partially evaporated milk, was entirely satisfactory in both respects. In the batch prepared with the powdered whole milk, an additional 6% of cocoa butter was required to reduce the viscosity sufficiently low for dipping purposes; although even with this addition a wholly satisfactory product was not secured, owing to the failure of the mixture to develop the milk flavor to the desired extent.

Instead of the spray-dried milk powder, as employed in the separation above set forth, I prepared a product having substantially the composition of a whole milk powder by intimately mixing a spray-dried skimmed milk and spray-dried cream, by which term I designate a separated milk product having a fat content exceeding 7.50%. A typical spray-dried skim milk powder employed in accordance with this invention contained 1.35% butter fat with 2.80% moisture, being derived from a skim milk containing 0.13% butter fat. The spray-dried cream powder may suitably be a product containing approximately 50% of butter fat with 1% or less of moisture, and corresponding to a cream or high-fat milk portion containing about 8.3% butter fat. The spray-dried skim milk powder and spray-dried cream powder are mixed in proportion to secure a combined product having the butter fat content of a spray-dried whole milk powder; for example, 26 to 28% butter fat. The combined product, while having the physical characteristics of spray-dried milk, such as fine particle size, and the spherical shell configuration, differed markedly from spray-dried whole milk in having to a high degree the property of coalescence on trituration at temperatures equal to or above the melting point of butter fat, and likewise differs markedly from spray-dried whole milk powder in behavior in the production of milk chocolate. For example, in the chocolate mixture above referred to, when employed in quantity to provide the same proportion of milk solids and with the other constituents in the same proportions as when a partially evaporated milk was used, it produced a product having a fully developed milk flavor and a low viscosity suitable for dipping without the addition of any extra cocoa butter, as required when spray-dried whole milk powder was employed. The product was fully equal to or superior to that derived by the use of partially evaporated whole milk. Furthermore, the expense in production is substantially less than when partially evaporated milk is employed, since the evaporation of the residual water present in the partially evaporated milk is not required.

It is my belief that the improved results secured in accordance with the present invention are due to the fact that, on spray-drying a milk product containing 7½% butter fat or higher, whereby a spray-dried product containing at least 42% butter fat (on an anhydrous basis) is produced, the finely dispersed fat particles are not fully coated with casein and thereby coalescence of the fat can be secured on trituration when warm. When such a product is mixed with a spray-dried powdered milk or milk product having a lower-fat content than powdered milk, on trituration, the coalescing fat particles of the powdered spray-dried, powdered cream product likewise incorporates in a uniform mass the lower-fat containing, normally non-coalescent product, this action being apparently aided by the similarity in the casein particles of the constituent materials, both from the chemical and physical standpoints.

I claim:

1. The method of producing milk chocolate which comprises incorporating with finely divided cocoa solids, finely divided powdered milk solids, the latter comprising separately spray-dried portions, one of a milk product not higher in butter fat than whole milk and the other of a liquid milk product containing at least 7.50% butter fat, the fat particles of the milk solids being sufficiently free from fat impervious coatings to permit coalescence thereof on trituration, and triturating the mixture.

2. The method of producing milk chocolate which comprises incorporating with finely divided cocoa solids, finely divided powdered milk solids, the latter comprising separately spray-dried portions, one of skim milk and the other of cream containing at least 7.50% butter fat, the relative proportions of said separately spray-dried portions being such that their combined solids have substantially the proportions of the solids of whole milk and triturating the mixture whereby butter fat constituents of the mixture are caused to coalesce with themselves and with fat constituents of the cocoa solids.

In testimony whereof I have hereunto set my hand, this 16th day of May, 1930.

HERBERT E. OTTING.